United States Patent
Kutsuna

[11] Patent Number: 5,237,828
[45] Date of Patent: Aug. 24, 1993

[54] AIR-CONDITIONER FOR AN AUTOMOBILE WITH NON-AZEOTROPIC REFRIGERANT MIXTURE USED TO GENERATE "COOL HEAD" AND "WARM FEET" PROFILE

[75] Inventor: Kiyoharu Kutsuna, Anjo, Japan

[73] Assignee: Nippondenso Co., Ltd., Kariya, Japan

[21] Appl. No.: 961,024

[22] Filed: Oct. 14, 1992

Related U.S. Application Data

[63] Continuation of Ser. No. 615,629, Nov. 19, 1990, abandoned.

[30] Foreign Application Priority Data

Nov. 22, 1989 [JP] Japan .................. 1-303722

[51] Int. Cl.⁵ .............. 25B 29/00; 25B 41/00; B60H 1/00
[52] U.S. Cl. .................... 62/114; 62/244; 62/502; 165/22; 165/43
[58] Field of Search ............. 165/42, 43, 29, 22; 62/114, 502, 244

[56] References Cited

U.S. PATENT DOCUMENTS

| | | | |
|---|---|---|---|
| 2,794,322 | 6/1957 | Etherington | 62/3 |
| 2,794,328 | 6/1957 | Herrick | 62/115 |
| 2,938,362 | 5/1960 | Schwind | 62/149 |
| 3,698,202 | 10/1972 | Missimer | 62/114 |
| 4,290,272 | 9/1981 | Vakil | 62/114 |
| 4,344,292 | 8/1982 | Rojey | 62/114 |
| 4,406,135 | 9/1983 | Rojey et al. | 62/114 |
| 4,423,603 | 1/1984 | Oguni et al. | 62/114 |
| 4,428,853 | 1/1984 | Ramet et al. | 252/67 |
| 4,468,337 | 8/1984 | Ramet et al. | 62/116 |
| 4,769,999 | 9/1988 | Fujiwara et al. | 62/114 |
| 4,781,738 | 11/1988 | Fujiwara et al. | 62/114 |
| 4,829,777 | 5/1989 | Matsuoka et al. | 62/227 |
| 4,899,809 | 2/1990 | Takenaka et al. | 165/43 |
| 4,913,714 | 4/1990 | Ogura et al. | 62/502 |
| 4,938,033 | 7/1990 | Ogihara | 165/16 |
| 4,940,083 | 7/1990 | Takenaka et al. | 165/43 |
| 4,961,323 | 10/1990 | Katsuna et al. | 62/502 |
| 4,994,958 | 4/1989 | Iida | 165/43 |

FOREIGN PATENT DOCUMENTS

| | | | |
|---|---|---|---|
| 2400161 | 4/1979 | France | 165/42 |
| 0147909 | 9/1982 | Japan | 165/29 |
| 0085711 | 5/1983 | Japan | 165/22 |
| 0032511 | 2/1984 | Japan | 165/22 |
| 0232916 | 10/1986 | Japan | 165/22 |
| 0238505 | 10/1986 | Japan | 165/43 |
| 63-294459 | 12/1988 | Japan . | |
| 64-1787 | 1/1989 | Japan . | |

Primary Examiner—John K. Ford
Attorney, Agent, or Firm—Cushman, Darby & Cushman

[57] ABSTRACT

An air conditioner for an automobile uses a non-azeotropic mixture refrigerant. The air conditioner has an evaporator for evaporating the refrigerant and cooling air passing through the evaporator. The air has a temperature slope after passing through the evaporator. An air dividing damper disposed downstream of the evaporator divides the cooled air into cold air and not-so-cold air for use in various ways in the passenger compartment.

14 Claims, 4 Drawing Sheets

AIR-CONDITIONER FOR AN AUTOMOBILE WITH NON-AZEOTROPIC REFRIGERANT MIXTURE USED TO GENERATE "COOL HEAD" AND "WARM FEET" PROFILE

This is a continuation of application Ser. No. 07/615,629, filed Nov. 19, 1990, which will become abandoned upon the filing hereof.

FIELD OF THE INVENTION

The present invention relates to an air-conditioner for an automobile wherein a non-azeotropic mixture refrigerant is used.

BACKGROUND OF THE INVENTION

A Japanese unexamined patent (Kokai) 63-294459 shows an air-conditioner using a non-azeotropic mixture refrigerant. In such an air-conditioner, the temperature of the air passed through an evaporator varies widely along a passage of the refrigerant. It is not always comfortable for passengers to receive such air.

SUMMARY OF THE INVENTION

An object of the present invention is to put the variety of temperatures of the air to good use.

To achieve the object mentioned above, the air-conditioner of the present invention has an air dividing damper downstream of an evaporator for dividing the air passed through the evaporator into two streams. The one stream is relatively high in temperature and the other is relatively low in temperature. The colder air is directed towards a passenger's face for a better feeling, while the warmer air if used is directed below the passenger's face.

Other objects and advantages will occur to those skilled in the art upon obtaining an understanding of this invention by the following description thereof in conjunction with the attached drawings, in which:

DETAILED DESCRIPTION OF THE PREFERRED EMBODIMENT

Figure 1:
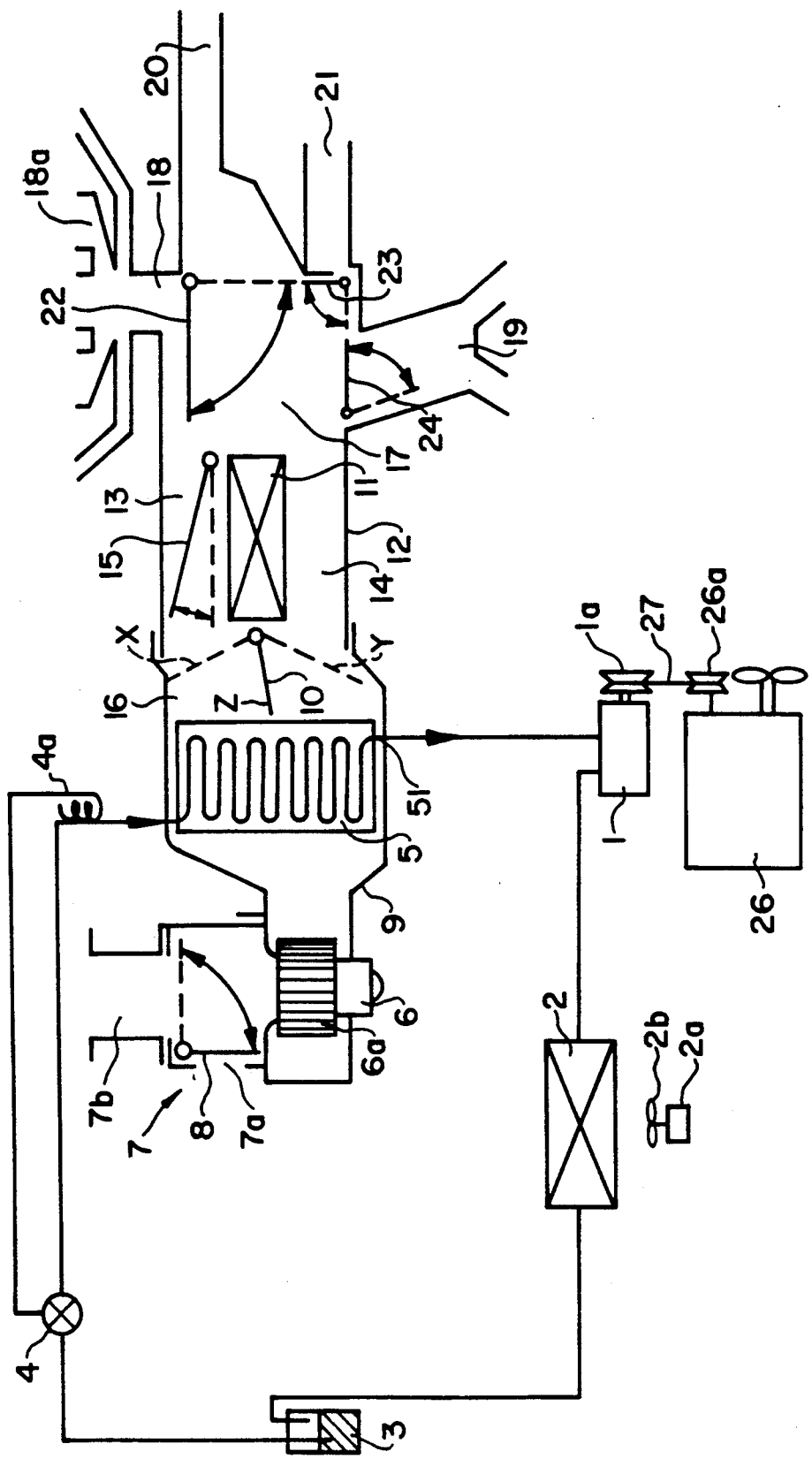
FIG. 1 is a schematic view of the embodiment.

FIG. 1 shows a schematic structure of an air-conditioner for an automobile wherein a non-azeotropic mixture refrigerant includes a main-refrigerant and a sub-refrigerant. The main-refrigerant is chosen from Freons R12, Freons R124, Freon R142b and Freon R134a. The sub-refrigerant is sen from Freons R23 and Freons R116. Freons R14 is less than 3% of the mixture refrigerant in weight thereof, Freons R23 is less than 10% and Freons R116 is less than 10%.

A compressor 1 is driven by an engine 26 through a magnetic clutch 1a, a belt 27 and a pulley 26a. The magnetic clutch 1a is controlled electrically to connect or disconnect the compressor 1 from the engine 26. The compressor 1 compresses the refrigerant to a certain high pressure value.

A condenser 2 comprises a winding tube through which the compressed refrigerant passes. A fan 2b driven by a motor 2a is disposed in front of the condenser 2 for supplying air to the condenser 2. The refrigerant passing through the condenser 2 is condensed.

The condensed refrigerant comes into a receiver 3. The receiver 3 separates the liquid phase refrigerant from the gas phase refrigerant.

An expansion valve 4 is disposed downstream of the receiver 3 and expands the condensed refrigerant for reducing the pressure value thereof. The expansion valve 4 has a sensing tube 4a for sensing the temperature of the refrigerant downstream of the expansion valve 4. The same kind of refrigerant is in the sensing tube 4a.

An evaporator 5 comprises a serpentine tube through which the expanded refrigerant passes. The refrigerant absorbs heat from air passing around the evaporator 5 and evaporates as it goes through the evaporator 5. The air for heat-exchanging comes from a fan 6a driven by a motor 6. The fan 6a, the motor 6 and the evaporator 5 are disposed in a case 9 made from resin. An outlet of the refrigerant from the evaporator 5 is disposed on the lower side of case 9.

An air switching box 7 is connected to the case 9 which has an inside air inlet 7a and an outside air inlet 7b. The inside air of an automobile is introduced into the air switching box 7 through the inside air inlet 7a, and outside air of the automobile is introduced into the air switching box 7 through the outside air inlet 7b. A damper 8 shaped like a plate is disposed in the air switching box 7 for alternately opening and closing the inside air inlet 7a and the outside air inlet 7b. The air introduced by the fan 6a flows through the evaporator 5 around the tube.

At the air downstream side of the evaporator 5, an air dividing damper 10 is provided. The air dividing damper 10 is shaped like a plate and is pivoted on a case 12 at one end thereof. The other end of the damper 10 confronts the evaporator 5. The damper 10 takes a position within a range from a position X to a position Y in an air mixing space 16. The positions X and Y are represented by broken lines in FIG. 1.

A heater 11 is disposed in the case 12. Hot water from the engine 26 flows in the heater 11 and heats air passing through the heater 11. A first bypass passage 13 is formed on an upper side of the heater 11 and a second bypass passage 14 is formed on a lower side of the heater 11. An air mixing damper 15 is disposed in the first bypass passage. Air received from evaporator 5 and which flows toward the first bypass passage 13 may be partially diverted by damper 15 from a side of the first bypass passage 13 to a side of the second bypass passage 14 through the heater 11. The damper 15 controls the amount of air which flows toward the heater 11 and the air which flows through the first bypass passage 13.

A defroster outlet 18 which has a plurality of openings one of which is shown at 18a is formed on the case 12. The air in air mixing room 17 is introduced toward a front window of the automobile through the defroster outlet 18 and the openings 18a.

A face outlet 20 is formed in the case 12 and introduces the air toward a passenger's face.

A room outlet 21 is formed on the case 12 and introduces the air toward a passenger's body.

A foot outlet 19 is formed on the case 12 and introduces the air toward a passenger's foot.

A face damper 22 is pivoted on the case 12 for opening and closing the face outlet 20 and the defroster outlet 18. A room damper 23 is pivoted on the case 12 for opening and closing the room outlet 21. A foot damper 26 is pivoted on the case 12 for opening and closing the foot outlet 19.

Figure 3:
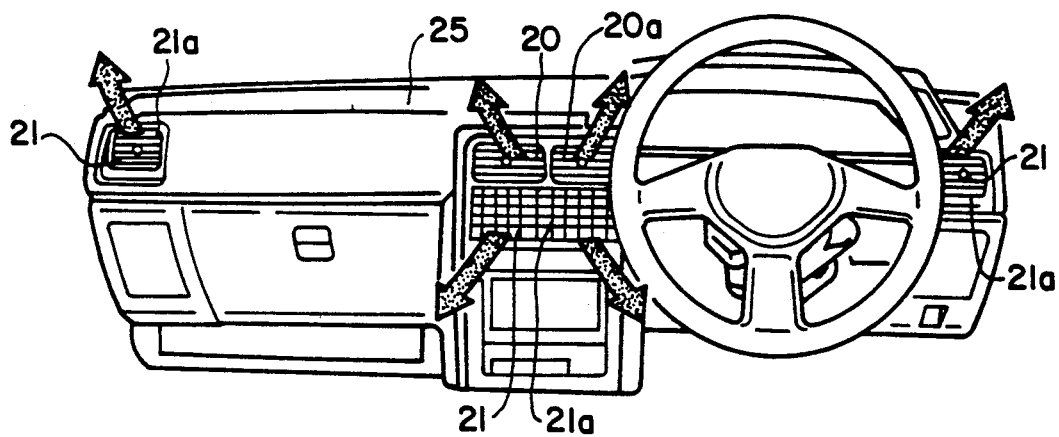
FIG. 3 is a front view of the instrument panel of the embodiment.

FIG. 3 shows an instrument panel 25 of the automobile. The face outlets 20 are disposed on a center portion of the instrument panel 25 and have louvers 20a for varying the blowing direction of the air. The room outlets 21 are disposed under the face outlets 20 and on both sides of the instrument panel 25. The room outlets 21 also have louvers 21a for varying the blowing direction of the air.

The positions of all dampers mentioned above are controlled by levers (not shown) provided on the instrument panel 25.

The operation of the air-conditioner is now described.

When the magnetic clutch is turned on, a driving force is transmitted from the engine 26 to the compressor 1 through the belt 27, so that the compressor 1 begins to compress the refrigerant. The compressed refrigerant goes through the condenser 2, the receiver 3 and the expansion valve 4 and then evaporates in the evaporator 5. The evaporated refrigerant comes back to the compressor 1.

Figure 4:
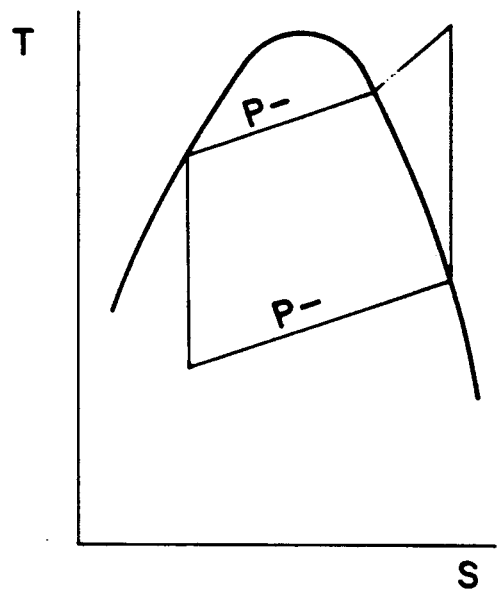
FIG. 4 is a diagram showing a relation of entropy and absolute temperature.

FIG. 4 shows the relation of entropy and absolute temperature in the present embodiment. The refrigerant evaporates under a constant pressure and the temperature of the refrigerant increases in the evaporator 5.

Figure 5:
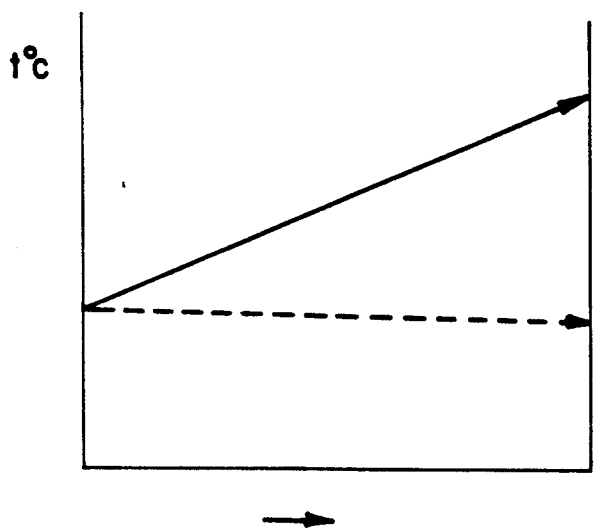
FIG. 5 is a diagram showing the temperature of the refrigerant in the evaporator.

FIG. 5 shows the temperature of the refrigerant in the evaporator 5 along a refrigerant passage. The temperature of a single refrigerant is almost constant in the whole passage. The temperature of the non-azeotropic mixture refrigerant increases as it gets closer to the outlet of the refrigerant, so that the temperature of the air passing through and around the evaporator 5 increases as it goes from the inlet to the outlet. That is, the temperature of the air passing through and around a lower portion of the evaporator 5 is higher than that of the air passing through and around an upper portion of the evaporator 5.

When the fan 6a is driven, air is introduced into the air switching box 7 through the inside air inlet or the outside air inlet, and then the air flows through and around the evaporator 5. The air passing through the evaporator 5 is cooled down by exchanging heat with the refrigerant flowing through the evaporator 5.

Figure 2:
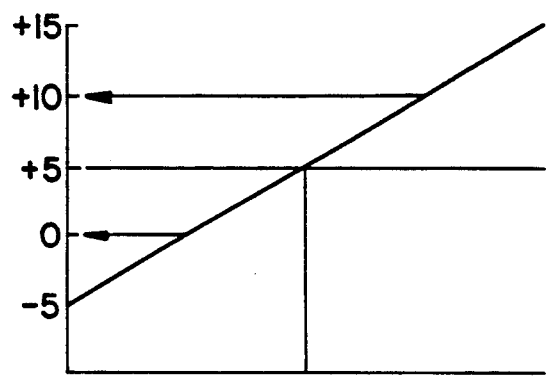
FIG. 2 is a diagram showing the temperature of the refrigerant in the evaporator.

As shown in FIG. 2 the temperature of a non-azeotropic mixture refrigerant varies from $-5°$ C. to $15°$ C. as the refrigerant flows from the inlet to the outlet of the evaporator 5. The air passed through the evaporator 5 also varies its temperature from $-5°$ C. to $15°$ C. However, the single refrigerant stays substantially steady at $5°$ C.

The air dividing damper 10 divides the air passed through the evaporator 5 into two streams, one of which (the upper or upstream) is lower in temperature, the other (lower or downstream) is higher in temperature. When the damper 10 is positioned at the position Z, the air is divided at the center portion of the evaporator 5. The temperature of the air passed above the damper 10 averages $0°$ C. and the temperature of the air passed under the damper 10 averages $10°$ C.

When the air mixing damper 15 is positioned horizontally along the broken line, the air passed through the upper portion of the evaporator 5 flows through the first bypass passage 13 and the air passed through the lower portion of the evaporator 5 flows through the second bypass passage 14.

When the face damper 22 closes the defrost outlet 18 and opens the face outlet 20, the room damper 23 opens the room outlet 21, and the foot damper 24 closes the foot outlet 19, the cool air passed through the first bypass passage 13 comes out from the face outlet 20 toward the passenger's face, and the not-so-cool or warmer cool air passed through the second bypass passage 14 comes out from the room outlet 21 for direction below the passenger's face and at both sides of the instrument panel 25.

Figure 6:
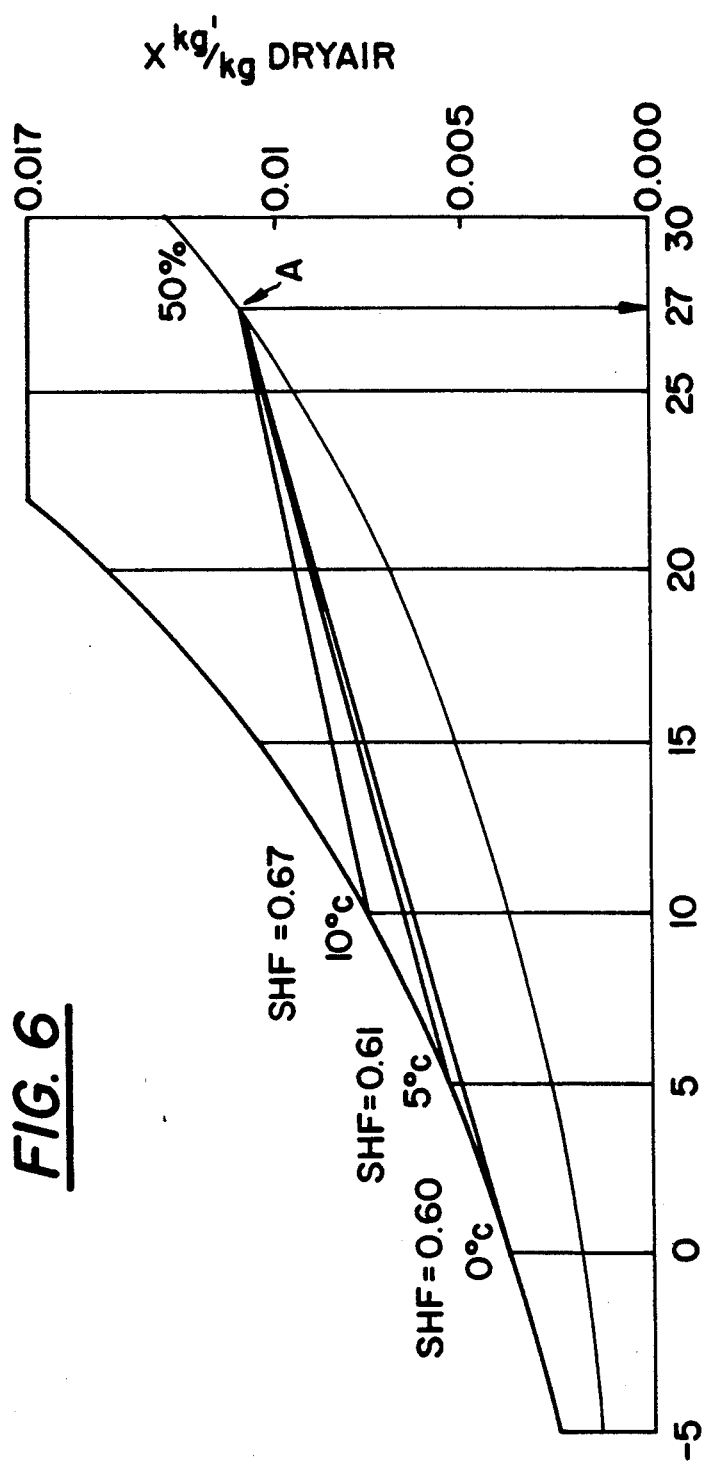
FIG. 6 is a diagram showing the relation of the temperature of the air and absolute humidity.

FIG. 6 shows the relationship between temperature of the air and the amount of moisture contained in the air. The $0°$ C. air has 0.60 sensible heat factor (S.H.F.) and the $10°$ C. air has 0.67 sensible heat factor. The divided air has 0.635 sensible heat factor on the average. When the single refrigerant is used, the air passed through the evaporator 5 is $5°$ C. in temperature and 0.61 in sensible heat factor. Point A represents air coming into the evaporator 5, which is $27°$ C. in temperature and 50% relative humidity.

In the present embodiment, the average sensible heat factor is 1.04 ($=0.635/0.61$) times and the humidity is reduced 4%, so that the ability to cool the air increases 4%.

When the air dividing damper 10 is positioned at the position Y so as not to divide the air but to close the second bypass passage 14, the air passed through the evaporator 5 is mixed in the room 16 and flows through the first bypass passage 13. The flowing air is $5°$ C. in temperature and comes out from the face outlet 20 and the room outlets 21.

When heating is required, the air dividing damper lo is positioned at the position Y to close the second bypass passage 14, and the air mixing damper 15 controls the amount of air flowing through the heater 11.

It is possible to dispose the outlet 51 of the refrigerant 5 on the upper side of the case 9 instead of the lower side. In that case, the face outlet 20 is disposed on the lower side of the case 12 and the room outlet 21 is disposed on the upper side of the 12. It is also possible to make subsidiary passages in the air mixing room 17 for introducing the cooled air toward the face outlet 20 and for introducing the warmer cool air toward the room outlet 21.

It is possible to provide more than two air dividing dampers to divide the air into more than two streams.

Other variations and modifications will be apparent to those skilled in the art, all of which are comprehended by the following claims.

What is claimed is:

1. An air conditioner, which uses a non-azeotropic mixture refrigerant, for an automobile having a passenger compartment, comprising:
   a non-azeotropic mixture refrigerant including at least a first refrigerant of a first boiling point and a second refrigerant of a second boiling point different than said first boiling point;
   compressor means for compressing said non-azeotropic mixture refrigerant to produce compressed refrigerant;
   condenser means for condensing refrigerant to produce condensed refrigerant;
   expanding means for expanding the condensed refrigerant;

evaporator means having an inlet receiving said expanded refrigerant and an outlet which the refrigerant flows out after passing through the evaporator, for evaporating the expanded non-azeotropic refrigerant to cool air passing therethrough and positioned to have a first area nearest the inlet and a second area nearest the outlet;

means for introducing air into and through said evaporator for developing cooled air;

air dividing means for dividing the cooler air from said evaporator into a first cooler air stream which has passed through said first portion near said inlet and a second warmer air stream which has passed through said second portion near said outlet, a temperature of the first air stream being colder than a temperature of the second air stream;

a first air duct, receiving the first cooler air stream, and exhausting the first cooler air stream in the passenger compartment towards a top part of a passenger's body; and a second air duct receiving the second warmer air stream, and exhausting the second warmer air stream toward a bottom part of the passenger's body, below the top part.

2. An air conditioner as in claim 1, wherein the evaporator means comprises a refrigerant passage connecting said inlet and said outlet, and means for defining an air passage across said refrigerant passage.

3. An air conditioner as in claim 2, wherein said evaporator means has a temperature gradient along a length of said refrigerant passage of approximately 20° C.

4. An air conditioner as in claim 2, wherein said evaporator means has a temperature gradient along a length of said refrigerant passage of 20° C., a temperature of said non-azeotropic mixture refrigerant near said inlet being 20° C. colder than a temperature of said non-azeotropic mixture refrigerant near said outlet.

5. An air conditioner as in claim 2, wherein said evaporator means has a temperature gradient along a length of said refrigerant passage of 20° C., the temperature gradient being generated by a progress of an evaporation of said non-azeotropic mixture refrigerant in said inlet toward said outlet.

6. An air conditioner as in claim 1, wherein the air dividing means comprises a plate shaped damper which is disposed downstream of the evaporator.

7. An air conditioner as in claim 1, further comprising an air passage disposed downstream of said evaporator, wherein said air dividing means divides said air passage into a first air passage for said first air stream and a second air passage for said second air stream.

8. An air conditioner as in claim 7, further comprising a heater disposed between said first air passage and said second air passage for heating air flowing from said first passage to said second passage.

9. An air conditioner as in claim 8, further comprising an air mixing damper disposed in said first air passage for controlling an amount of air which flows toward said heater and the air which flows through said first passage.

10. An air conditioner as in claim 9, wherein the air dividing means comprises a plate-shaped damper which is disposed downstream of the evaporator for controlling a ratio of air which flows toward said first air passage and said second air passage.

11. A refrigeration cycle system for cooling or heating both of a first area and a second area which exhausts into a passenger compartment comprising:

a non-azeotropic mixture refrigerant including at least a first refrigerant of a first boiling point and a second refrigerant of a second boiling point different than said first boiling point;

a refrigeration cycle including heat exchanging means for passing said non-azeotropic mixture refrigerant therethrough, said means having a refrigerant inlet, a refrigerant outlet, a first heat exchanging portion near said inlet and a second heat exchanging portion near said outlet, said first heat exchanging portion and said second heat exchanging portion having a temperature difference which is generated by said non-azeotropic mixture refrigerant such that said first heat exchanging portion is cooler than said second heat exchanging portion;

wherein said first heat exchanging portion being disposed in the first area and said second heat exchanging portion being disposed in the second area so that a temperature of said first area is cooler than a temperature of said second area, an air passage accommodating said heat exchanging means;

a first air duct, located to receive a first cooler air stream which has passed over said first area, and exhausting the first cooler air stream in the passenger compartment towards a top part of a passenger's body; and a second air duct, located to receive a second warmer air stream which has passed over said second area, and exhausting the second warmer air stream toward a bottom part of the passenger's body.

12. An air conditioner for an automobile having a passenger compartment, comprising:

a case;

a fan disposed in said case for introducing an air flow in said case;

an evaporating means for evaporating a non-azeotropic mixture refrigerant including at least tow different boiling point refrigerants and having a refrigerant inlet and a refrigerant outlet, said evaporating means disposed in said case and cooling the air introduced by said fan;

an air dividing means for dividing the cooler air from said evaporating means into a first air stream which has passed through a first portion near said inlet to form a stream of cooler air and a second air stream which is warmer than said first air stream and has passed through a second portion near said outlet to form a stream of warmer air said first heat exchanging portion and said second heat exchanging portion having a temperature difference which is generated by said non-azeotropic mixture refrigerant such that said first heat exchanging portion is cooler than said second heat exchanging portion;

a first bypass passage disposed downstream of said air dividing means receiving said first cooler air stream;

a second bypass passage disposed downstream of said air dividing means, receiving said second warmer air stream;

a heater disposed between said first bypass passage and said second bypass passage selectively heating air flowing from said first passage to said second passage;

an air mixing damper disposed in said first bypass passage for controlling an amount of air which flows toward said heater and an amount of air which flows through said first bypass passage;

an air mixing area disposed downstream of said first bypass passage and said second bypass passage;

a face outlet coupled to said first bypass passage for introducing said cooler air toward a passenger's face; and a room outlet coupled to near said second bypass passage for introducing said warmer air towards a passenger's body under the passenger's head.

13. An air conditioner for an automobile as in claim 12, wherein said air dividing means includes means for closing at least one bypass passage to direct a cooled air from said evaporating means toward a remaining bypass passage only.

14. A method for introducing at least two different temperature air flows into a passenger compartment using a refrigeration cycle, comprising the steps of:

operating a compressor of a vapor compression refrigeration system including a condenser, expansion means and an evaporator with a non-azeotropic mixture of refrigerant in such a way as to intentionally produce a temperature gradient across its evaporator from inlet to outlet, so that a part of the evaporator closer to the inlet is colder than a part closer to the outlet;

blowing air across said evaporator to form a cooler stream of air which has passed closer to the inlet and a warmer stream of air which has passed closer to the outlet;

separating said air into a cooler portion which has passed near said inlet and passing said cooler portion to an air outlet into a passenger compartment toward a user's head, and a warmer portion which has passed near said outlet and passing said warmer portion to a separate air outlet into a passenger compartment toward a user's body under the user's head.

* * * * *